United States Patent
Vidalenche et al.

(10) Patent No.: US 10,186,873 B2
(45) Date of Patent: Jan. 22, 2019

(54) SAFE ELECTRICAL POWER-SUPPLY SYSTEM

(71) Applicant: SCHNEIDER ELECTRIC INDUSTRIES SAS, Rueil Malmaison (FR)

(72) Inventors: Gilles Vidalenche, Jarrie (FR); Thierry Peduzzi, Villard-Bonnot (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 900 days.

(21) Appl. No.: 14/592,097

(22) Filed: Jan. 8, 2015

(65) Prior Publication Data

US 2015/0214743 A1 Jul. 30, 2015

(30) Foreign Application Priority Data

Jan. 27, 2014 (FR) ...................................... 14 50652

(51) Int. Cl.
*H01F 1/00* (2006.01)
*H01F 3/00* (2006.01)
(Continued)

(52) U.S. Cl.
CPC .............. *H02J 4/00* (2013.01); *H02J 7/0032* (2013.01); *H02J 9/062* (2013.01); *H02J 2009/007* (2013.01); *Y10T 307/636* (2015.04)

(58) Field of Classification Search
CPC .. H02J 4/00; H02J 7/0032; H02J 9/062; H02J 2009/007; Y10T 307/636
(Continued)

(56) References Cited

U.S. PATENT DOCUMENTS

| 5,598,039 A | 1/1997 | Weber |
| 6,751,562 B1 | 6/2004 | Blackett et al. |

(Continued)

FOREIGN PATENT DOCUMENTS

WO WO 2009/030027 A1 3/2009

OTHER PUBLICATIONS

French Preliminary Search Report dated Oct. 10, 2014, in French Application No. 14 50652 filed Jan. 27, 2014 (with English Translation of Categories of Cited Documents).

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

The invention relates to a secure electrical supply system for powering an electrical load (3) comprising:
  a main electrical power supply source (1),
  an electrical power supply circuit (8) linking the main electrical power supply source (1) to the electrical load,
  at least one control unit (5) for opening or closing said electrical power supply circuit (8),
  a secondary electrical power supply source (2) connected to the electrical power supply circuit and designed to power the electrical load (3) in case of interruption of the electrical power supply provided by the main electrical power supply source (1),
  a control device (6) comprising an emitter device (60) designed to dispatch a message representative of a change of state of the control unit (5) and a receiver device (61) designed to receive said message and to control the turning on or the turning off of said secondary electrical power supply source (2) according to the new state taken by the control unit (5).

9 Claims, 2 Drawing Sheets

(51) Int. Cl.
*H02J 1/16* (2006.01)
*H02J 3/30* (2006.01)
*H02J 4/00* (2006.01)
*H02J 7/00* (2006.01)
*H02J 9/06* (2006.01)
*H02J 9/00* (2006.01)

(58) Field of Classification Search
USPC .......................................................... 307/68
See application file for complete search history.

(56) References Cited

U.S. PATENT DOCUMENTS

| | | |
|---|---|---|
| 2009/0070447 A1 | 3/2009 | Jubinville et al. |
| 2010/0096929 A1* | 4/2010 | Wang ...................... H02J 9/061 307/80 |
| 2011/0161468 A1 | 6/2011 | Tuckey et al. |
| 2014/0015324 A1* | 1/2014 | Brennan ................. H02J 3/383 307/72 |
| 2014/0170990 A1* | 6/2014 | Black ..................... H04B 1/401 455/73 |

* cited by examiner

SAFE ELECTRICAL POWER-SUPPLY SYSTEM

TECHNICAL FIELD OF THE INVENTION

The present invention pertains to a secure electrical power supply system.

PRIOR ART

In a known manner, a secure electrical supply system for powering an electrical load comprises:
- a main electrical power supply source designed to power the electrical load,
- a power supply circuit linking the main electrical power supply source to the electrical load,
- at least one control unit controlled to the open state or to the closed state so as to respectively open or close said electrical power supply circuit,
- a secondary electrical power supply source connected to the power supply circuit and designed to power the electrical load in case of interruption of the electrical power supply originating from the main electrical power supply source.

The secondary electrical power supply source is more commonly called an inverter and comprises a battery which is the energy source for powering the electrical load in case of interruption of the electrical power supply originating from the main electrical power supply source. During an interruption of the electrical power supply originating from the main electrical power supply source, for example subsequent to a trip-out, the secondary electrical power supply source powers the load until the energy stored in its battery is exhausted or until the main electrical power supply is restored. The problem with this mode of operation is that if the load does not consume any energy, the inverter discharges the battery by self-consumption, this being detrimental to the subsequent availability of the secondary power supply source.

The aim of the invention is to propose a solution which makes it possible to increase the availability of the secondary electrical power supply source by conserving the energy stored in its battery and which therefore makes it possible to avoid the discharging of the battery of the secondary electrical power supply source when the control unit is in the open state and the electrical load is not connected.

DISCLOSURE OF THE INVENTION

This aim is achieved by a secure electrical supply system for powering an electrical load comprising:
- a main electrical power supply source,
- an electrical power supply circuit linking the main electrical power supply source to the electrical load,
- at least one control unit controlled to the open state or to the closed state so as to respectively open or close said electrical power supply circuit,
- a secondary electrical power supply source connected to the electrical power supply circuit and designed to power the electrical load in case of interruption of the electrical power supply provided by the main electrical power supply source,
- a control device comprising an emitter device designed to dispatch a message representative of a change of state of the control unit and a receiver device designed to receive said message and to control the turning on or the turning off of said secondary electrical power supply source according to the new state taken by the control unit.

According to a particular feature, the emitter device and the receiver device are designed to communicate with one another over a wireless communication link.

According to another particular feature, the emitter device comprises a radiofrequency emitter and a processing unit, said processing unit being designed to control the dispatching of said message by the radiofrequency emitter.

According to another particular feature, the emitter device comprises a control switch and it comprises a mechanical, magnetic or optical link linking said control switch with the control unit, said control switch being connected to the processing unit.

According to another particular feature, the emitter device comprises a converter cooperating with the control unit and said converter is designed to convert mechanical energy generated during a change of state of the control unit into electrical energy and said converter is connected to the processing unit and to the radiofrequency emitter so as to be able to supply them with electrical energy.

According to another particular feature, the converter is a piezoelectric generator or an electromagnetic generator.

According to another particular feature, the emitter device is connected in parallel with the control unit and the processing unit is designed to detect the state of the control unit during a situation of short-circuit or of non-short-circuit across the terminals of the control unit.

In the following various situations, it is therefore a matter, during an interruption of the electrical power supply originating from the main electrical power supply source, of:
- not starting the secondary power supply source if the load did not consume any energy before the interruption,
- turning off the secondary electrical power supply source when the electrical load no longer consumes energy,
- starting the secondary electrical power supply source when there is a command to close the control unit of the electrical power supply circuit of the electrical load.

BRIEF DESCRIPTION OF THE FIGURES

Other characteristics and advantages will become apparent in the detailed description which follows offered with regard to the appended drawings in which.

DETAILED DESCRIPTION OF AT LEAST ONE EMBODIMENT

Figure 1:
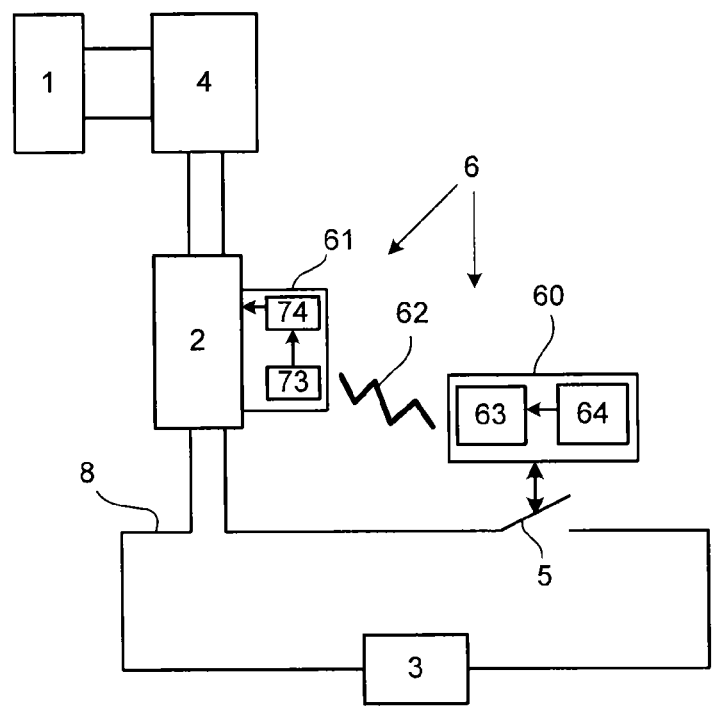
FIG. 1 represents, in a schematic manner, the secure electrical power supply system of the invention.

The invention relates to a secure electrical power supply system in which a secondary electrical power supply source 2 is designed to take over from a main electrical power supply source 1 during an interruption of the electrical power supply originating from the main electrical power supply source 1. In a more concrete manner, the main electrical energy source is for example the electrical network to which an electrical load is connected.

The electrical load 3, for example a lamp, is linked by an electrical power supply circuit (8) to the main electrical power supply source 1. The secondary electrical power supply source 2 is also connected to this electrical power supply circuit (8).

Moreover, at least one trip switch 4 is for example designed to monitor the electrical power supply circuit (8). In case of interruption of the electrical power supply originating from the main electrical power supply source 1, for example subsequent to a trip-out, the electrical load 3 can no longer be powered by the main electrical energy source 1 and the secondary electrical power supply source 2 then takes over. The secondary electrical power supply source 2 is what is called an inverter and comprises one or more batteries discharging in order to power the electrical load 3 in case of interruption of the electrical power supply originating from the main electrical power supply source 1.

Moreover, a control unit 5, for example a toggle switch, a push-button, a multiway switch, a stepping switch, a contactor or a relay is connected to the electrical power supply circuit (8) and controlled between an open state and a closed state so as to respectively open or close the electrical power supply circuit (8) and thus act or not act, according to its state, on the electrical load 3.

Customarily, during an interruption of the electrical power supply originating from the main electrical power supply source 1, the secondary electrical power supply source 2 discharges its batteries in order to power the electrical load 3. If the control unit 5 of the electrical power supply circuit of the load 3 is in the open state, the inverter discharges its battery by self-consumption.

To solve this problem, the secure electrical power supply system of the invention comprises a specific control device 6 which comprises an emitter device 60 and a receiver device 61, communicating with one another over a communication link 62. Preferably the communication link 62 is wireless but it would be possible to contemplate employing a wired communication link.

According to the invention, the emitter device 60 is designed to cooperate with the control unit 5 so as to dispatch to the receiver device 61 a message representative of the change of state of the control unit 5.

To communicate over the wireless communication link 62, the emitter device 60 preferably comprises a radiofrequency emitter 63 designed to dispatch a message representative of the change of state of the control unit 5 of the electrical power supply circuit (8). The dispatching of said message is thus synchronized with the closing or the opening of the control unit 5.

The emitter device 60 also comprises a processing unit 64 designed to detect the change of state of the control unit 5 and to generate a control command at the radiofrequency emitter 63 with a view to the dispatching of a message corresponding to this change of state.

To power the emitter device 60 and synchronize the control unit 5 with the control device 6, several embodiments can be envisaged.

Figure 2A:
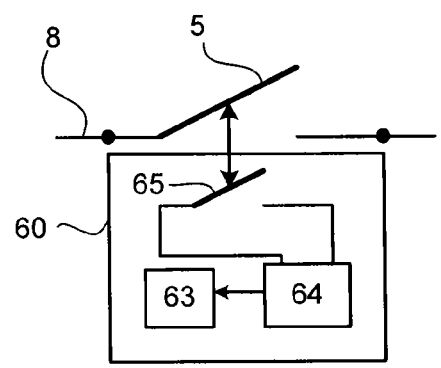
FIGS. 2A, 2B and 2C represent, according to two distinct embodiments, the control device employed in the system of the invention.

With reference to FIG. 2A, a first embodiment consists in furnishing the emitter device 60 with a control switch 65 and mechanically, magnetically or optically linking this control switch 65 with the control unit 5. The change of state of the control switch is detected by the processing unit 64 which generates a control command at the radiofrequency emitter 63 for the dispatching of a message representative of the detected state. The emitter device 60 is for example powered with the aid of an electric cell. A mechanical link between the control unit and the control switch is for example effected with the aid of a rod linking the two elements so as to synchronize their motions. On the other hand, a magnetic link is contactless and is effected for example by furnishing the control switch 65 with a magnet and the control unit 5 with a part made of ferromagnetic material. The inverse architecture is also possible. The displacement of the control unit 5, from one state to the other, brings about, by magnetic effect, a displacement of the control switch 65.

Figure 2B:
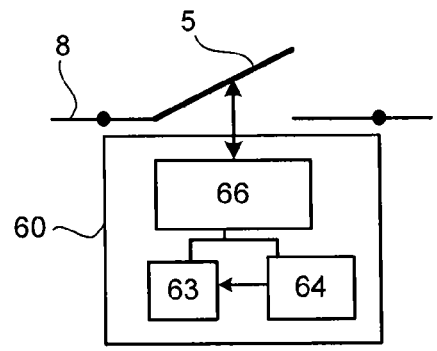

With reference to FIG. 2B, a second embodiment consists in furnishing the control device 6 with a converter 66, which is designed to convert the mechanical energy generated by the actuation of the control unit 5 into electrical energy intended to power the emitter device 60. The converter 66 may be for example a generator of piezoelectric type or an electromagnetic generator. The mechanical energy generated during the displacement of the control unit 5 during its change of state brings about the generation of an electric voltage employed to power the emitter device 60, that is to say its processing unit 64 and the radiofrequency emitter 63. According to the sign of the electric voltage generated, the processing unit 64 is designed to deduce the state of the control unit 5. The processing unit 64 then generates the message corresponding to the new state taken by the control unit 5 and dispatches a control command to the radiofrequency emitter 63 to control the dispatching of this message. The energy generated by the converter 66 is for example stored in one or more capacitors. An electrical energy management unit can be employed to manage the energy feeds to the components of the emitter device 60.

The piezoelectric generator will be for example embodied with the aid of a rod solidly attached to the control unit and designed to move through a piezoelectric-effect element. Such a solution is for example described in patent EP1238436B1.

The electromagnetic generator will be for example embodied by employing a permanent magnet and an electromagnetic coil. The permanent magnet is for example fixed on the control unit 5 and the electromagnetic coil is housed in the emitter device 60. A displacement of the control unit 5 from one state to the other brings about a displacement of the permanent magnet and a variation in magnetic flux in the electromagnetic coil. This magnetic flux variation gives rise to the creation of an electric current in the winding of the electromagnetic coil. Such a solution is for example described in patent application EP1952516A1.

Figure 2C:
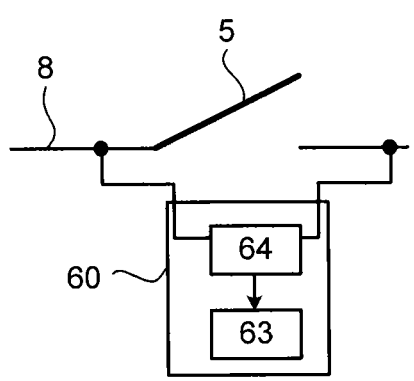

With reference to FIG. 2C, a third embodiment consists in connecting the emitter device 60 in parallel with the control unit 5 on the electrical power supply circuit. In this configuration, the processing unit 64 of the emitter device 60 detects the change of state of the control unit 5 by a short-circuit detection. When the control unit 5 passes from the open state to the closed state, the emitter device 60 is short circuited. This short circuiting is detected by the processing unit 64 of the emitter device which then orders the radiofrequency emitter 63 to dispatch a message representative of the closed state of the control unit 5. Conversely, the opening of the control unit is also detected by the processing unit 64 of the emitter device 63 by the end of the short-circuit and a message representative of the open state of the control unit 5 is dispatched by the radiofrequency emitter 63. In this embodiment, the emitter device 60 is for example powered with the aid of a cell or of a system for recharging a capacitor powered by the voltage across the terminals of the control unit 5 when it is in the open state.

The receiver device 61 comprises for its part a radiofrequency receiver 73 designed to receive each message dispatched by the radiofrequency emitter 63 of the emitter device 60. The receiver device 61 also comprises a processing unit 74 designed to process the message received and to dispatch a command to activate or to deactivate the secondary electrical power supply source 2, according to the state of the control unit 5. In the presence of an interruption of the electrical power supply originating from the main electrical power supply source 1, requiring the intervention of the secondary electrical power supply source 2 in order to power the electrical load 3, the receiver device 61 operates in the following manner:

If the control unit 5 is controlled from the closed state to the open state, the processing unit 74 of the receiver device 61 orders the deactivation of the secondary electrical power supply source 2.

If the control unit 5 is controlled from the open state to the closed state, the processing unit orders the activation of the secondary electrical power supply source.

Preferably, the emitter device 60 is coupled to the receiver device 61 and is designed to communicate with this receiver device 61. Of course, according to the configuration of the electrical power supply system, it is possible to contemplate employing several emitter devices coupled to a single receiver device.

The invention claimed is:

1. A secure electrical supply system for powering an electrical load, comprising:
    a main electrical power supply source,
    an electrical power supply circuit linking the main electrical power supply source to the electrical load,
    at least one controller controlled to the open state or to the closed state to respectively open or close said electrical power supply circuit,
    a secondary electrical power supply source connected to the electrical power supply circuit to power the electrical load in case of interruption of the electrical power supply provided by the main electrical power supply source, and
    a control device comprising an emitter device to dispatch a message representative of a change of state of the controller and a receiver device to receive said message, the control device being configured to control turning on or turning off of said secondary electrical power supply source according to a new state taken by the controller, the control device turning off the secondary electrical power supply when the electrical load draws no power prior to the interruption of the electrical power supply provided by the main electrical power supply source.

2. The system according to claim 1, wherein the emitter device and the receiver device communicate with one another over a communication link.

3. The system according to claim 2, wherein the communication link is wired.

4. The system according to claim 2, wherein the communication link is wireless.

5. The system according to claim 1, wherein the emitter device comprises a radiofrequency emitter and a processor, said processor being configured to control the dispatching of said message by the radiofrequency emitter.

6. The system according to claim 5, wherein the emitter device comprises a control switch and a mechanical, magnetic or optical link to link said control switch with the controller, said control switch being connected to the processor.

7. The system according to claim 5, wherein the emitter device comprises a converter cooperating with the controller and said converter is configured to convert mechanical energy generated during a change of state of the controller into electrical energy and said converter is connected to the processor and to the radiofrequency emitter to supply them with electrical energy.

8. The system according to claim 7, wherein the converter is a piezoelectric generator or an electromagnetic generator.

9. The system according to claim 3, wherein the emitter device is connected in parallel with the controller and the processor is configured to detect a state of the controller during a situation of short-circuit or of non-short-circuit across terminals of the controller.

* * * * *